United States Patent [19]
Christensen

[11] 3,811,192
[45] May 21, 1974

[54] HEIGHT GAUGE
[75] Inventor: Wynn L. Christensen, Yorba Linda, Calif.
[73] Assignee: Readx Inc., Garden Grove, Calif.
[22] Filed: Apr. 26, 1972
[21] Appl. No.: 247,646

[52] U.S. Cl. ............................................. 33/170
[51] Int. Cl. .......................................... G01b 5/00
[58] Field of Search ............ 33/169, 170, 171, 143, 33/125

[56] References Cited
UNITED STATES PATENTS
| | | | |
|---|---|---|---|
| 2,551,671 | 5/1951 | Harris | 33/143 K |
| 3,226,833 | 1/1966 | Lemelson | 33/171 |
| 3,449,833 | 6/1969 | Dzula | 33/125 M |
| 3,505,741 | 4/1970 | Meyer | 33/143 J |
| 2,932,899 | 4/1960 | Arzoian | 33/169 R |

FOREIGN PATENTS OR APPLICATIONS
| | | | |
|---|---|---|---|
| 76,699 | 6/1918 | Switzerland | 33/170 |
| 889,989 | 9/1953 | Germany | 33/170 |
| 22,555 | 0/1900 | Great Britain | 33/169 R |
| 416,204 | 11/1946 | Italy | 33/169 R |

Primary Examiner—Harry N. Haroian
Attorney, Agent, or Firm—Christie, Parker & Hale

[57] ABSTRACT

A height gauge has a slide mounted on a staff for vertical travel. A continuous band is driven by the slide and yields a direction and magnitude signal to a readout circuit. A rack gear on the staff engaged by a pinion on the slide provides for fine adjustment of the slide. Coarse adjustment is facilitated and effected by releasing the pinion from its drive so that it idles along the rack during vertical movement of the slide.

15 Claims, 6 Drawing Figures

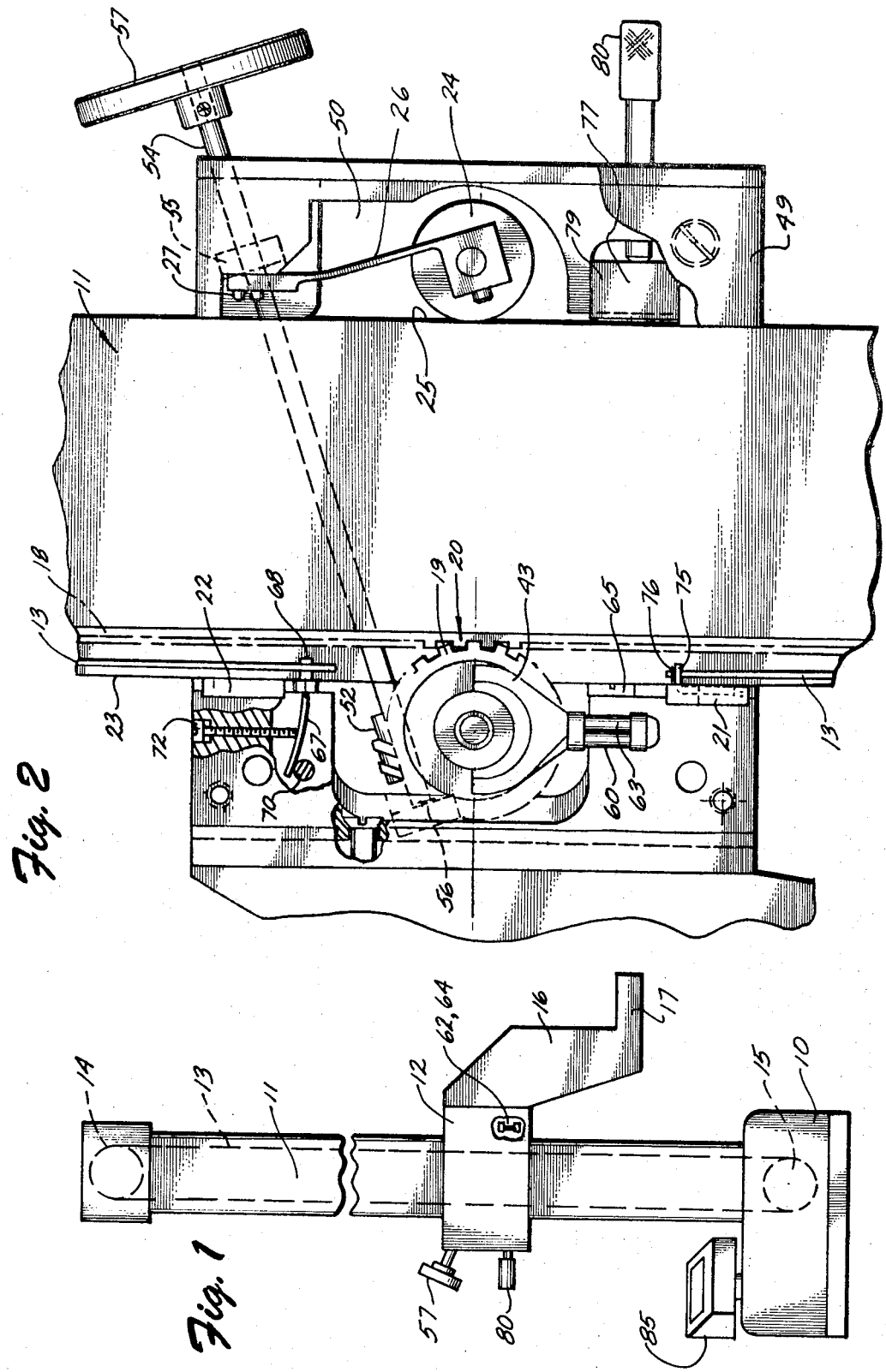

HEIGHT GAUGE

BACKGROUND OF THE INVENTION

The present invention relates to measuring instruments in general and, more in particular, to a continuous read-out height gauge.

Height gauges are used to determine vertical dimensions. Extremely accurate height gauges are often required because of the critical vertical dimensional requirements in many of today's applications. For example, height measurements of several inches often have to be accurate within 0.0001 inches.

One previously known device employs a slide height indication member mounted on a column with means to freely hand position the slide vertically on the column for coarse adjustment. Fine adjustment is effected by moving a gauge member with respect to the fixed slide, the gauge member being carried by the slide during coarse adjustment. One of the problems with this type of height gauge is that the coarse adjustment must be fairly accurate because of the limited adjustment facility of the fine adjustment, that is, the gauge member can only move a limited amount with respect to the slide and as a consequence the slide's coarse adjustment must be reasonably accurate.

A second type of height gauge has a continuous fine adjustment feature. For fine adjustment, the slide is driven up and down on the column by a split nut on the slide engaged with a rotating screw in the column. When the split nut is opened, coarse adjustment may be made by hand positioning the slide. One of the problems with this type of height gauge is that when the split nut engages the rotating screw, there is a strong likelihood that the slide will move in one vertical direction or the other because the flanks of the threads between the nut and screw are not in register. Another problem with the continuous fine adjustment height gauge employing a split nut and rotating screw is that the fine adjustment is effected either at the base or at the top of the device and these locations are remote from the workpiece.

Thus there is a need for a height adjustment gauge which has a continuous fine adjustment conveniently operable in the area of the work and which is not affected by positional changes occasioned by engagement of nuts with screws.

SUMMARY OF THE INVENTION

The present invention provides a continuous fine adjustment height gauge which is characterized in its facility for highly accurate measurement and its ease and convenience in operation.

One form of the present invention contemplates a vertically placeable, column-like pedestal or staff. A slide is carried by the staff and is capable of vertical movement on the staff. The staff has a longitudinally disposed rack gear and the slide has a pinion gear engaged with the rack. The rack gear and pinion gear provide a fine adjustment mechanism. Means is provided on the slide to turn the pinion gear and raise or lower the slide by virtue of the drive of the pinion on the rack. For coarse adjustments means on the slide is provided to effectively uncouple the pinion from the rack so that the slide can be positioned vertically by hand rapidly.

An aspect of the present invention is in its facility for a continuous read-out on a display. This facility is effected through the use of a member which depends from the slide to generate a slide direction and magnitude signal. Such a member may be a continuous band carried by the slide. The band is reeved over wheels at the top and bottom of the gauge to make it a continuous loop. The upper wheel is merely an idler but the band's drive of the lower wheel provides an input signal to a transducer which converts mechanical rotation into an electrical signal indicating direction and vertical position for the continuous read-out.

In greater detail, the fine adjustment feature of the present invention contemplates a worm drive, the worm of which is driven through a knob by hand. The worm engages a worm gear which rotates the pinion gear. The pinion gear and worm gear are normally coupled together through a clutch which engages the pinion gear. Disengagement of the clutch, however, frees the pinion gear from the worm gear and allows the pinion to idle free of the worm drive during coarse adjustments as it tracks on the rack gear of the staff.

The slide is accurately mounted on the staff by two-point contact on one end-face of the staff and a one-point contact on the opposite end-face of the staff. The two-point contact is effected through pairs of shoes at the bottom and top of the slide which engage the staff. A roller on the slide opposite the shoes engages the opposite face of the staff and provides for the single-point engagement. The roller is spring biased into engagement with the staff face.

If desired, a lock may be provided to lock the slide firmly with the staff. The lock may be in the form of a locking gib carried by the slide for engagement of the staff. The gib engages the track in response to actuation of some lock actuation means, such as a thumb screw.

Features of the present invention include means of adjusting the tension in the continuous band. This is done by splitting the band so that its ends are each attached to the slide. At one of the attachment points means are provided to increase or decrease tension in the band. These means may be in the form of a spring attached to the band and capable of having its tension adjusted as through an adjustment screw. The clutch between the pinion and the worm gear is conveniently disengaged by fork levers controlled by fingers which when squeezed together disengage the clutch. Springs in the coupling between the worm gear and the pinion gear normally maintain the two coupled.

These and other features, aspects and advantages of the present invention will become more apparent from the following description, appended claims and drawings.

BRIEF DESCRIPTION OF THE FIGURES

FIG. 1 is an elevational view, partly broken away, illustrating in general the height gauge of the present invention;

FIG. 2 is an elevational view, partly broken away and partly in section, illustrating the invention's slide and staff cooperation;

DESCRIPTION OF THE PREFERRED EMBODIMENTS

Figure 3:
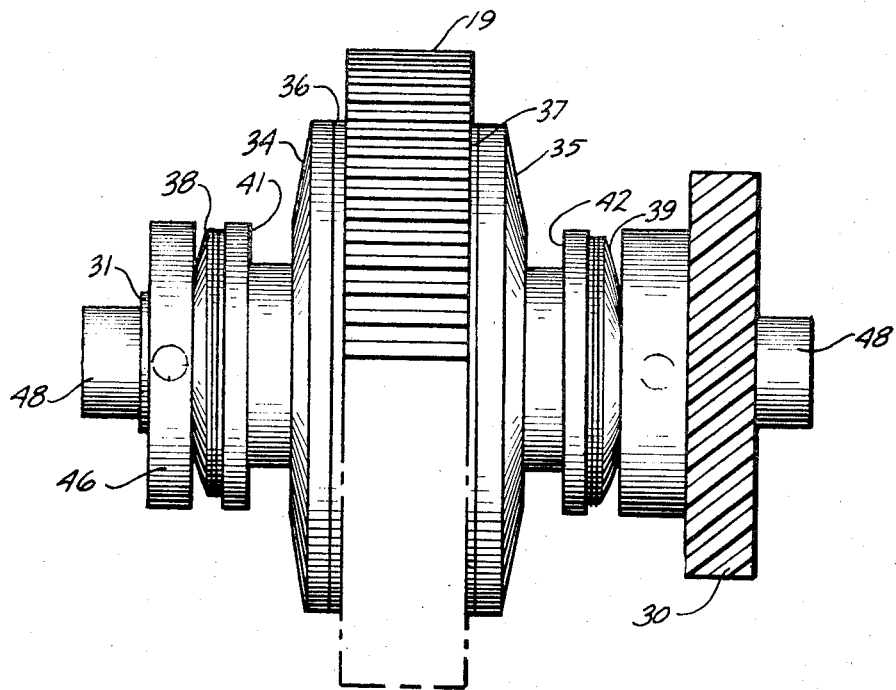
FIG. 3 is a detailed view of the invention's pinion gear and worm gear subassembly which is carried by the slide.

FIG. 1 illustrates in general the improved height gauge of the present invention. A base 10 mounts a vertically extending column-like staff 11. A slide 12 is vertically positionable on the staff. The slide carries a steel band 13 which is reeved over an upper wheel or pulley 14 and a lower wheel or pulley 15. Band 13 rotates the lower wheel in one direction or the other depending on whether the slide is raising or lowering. Rotation of the lower wheel is also a measure of how much the slide has raised or lowered. Consequently, the slide, band and lower wheel provide a convenient means for generating a direction and magnitude signal for a read-out circuit.

The slide has a slide arm 16 which has a foot 17 depending from it. The foot provides a mount for a standard feeler gauge or the like which is used to indicate the beginning and ending points in a measurement. The feeler gauge is not shown because it is a standard item and is not part of the present invention as such.

With reference to FIG. 2, staff 11 has a rack gear 18 extending its entire vertical height. This rack gear meshes with a pinion gear 19 of a fine adjustment assembly 20. The fine adjustment assembly has a clutch to free the pinion gear from its drive and enable it to idle up or down rack gear 18. A foot 21 and a foot 22 are mounted to slide 12 proximate its bottom and top to engage a face 23 of staff 11. A cooperating foot cooperates with each of these feet on the opposite side of rack gear 18 so that one face of the staff will be engaged by four feet. The feet are of a wear resistant material. The faces which the feet engage extend outwardly from rack gear 18 and straddle it. The faces also extend the longitudinal length of the staff. On the opposite end face of the staff, shown at 25, single-point contact is effected through a spring-loaded roller 24. Roller 24 engages rear face 25 of the staff and is biased into this engagement through a leaf spring mount 26. End face 25 also extends the length of the staff. Leaf spring mount 26 is attached to a mounting boss of the body of the slide proper, as by fasteners 27.

Thus the slide engages the staff on its longitudinal end faces and the two are coupled together for low friction sliding contact on one end face of the staff and low friction rolling contact on the opposite end face of the staff.

Rotation of pinion gear 19 on rack gear 18 will move the slide in one direction or the other on the staff by virtue of the pinion gear's travel on the rack gear. The present invention provides for the freeing of the pinion gear from its drive to enable rapid coarse adjustment of the slide by hand to a desired position. The means for effecting these fine and coarse adjustment features will now be described in detail.

With reference to FIGS. 2 and 3, a worm gear 30 is keyed to a shaft 31. Pinion gear 19, through a bearing not shown, is carried on shaft 31 but is not keyed to it; that is, the pinion gear is rotatably carried by the shaft. A pair of clutch pressure plates 34 and 35 have friction facings 36 and 37, respectively, for engaging end faces of the pinion gear. The clutch pressure plates are slidably disposed on shaft 31. Spring washers 38 and 39 apply a force against the clutch pressure plates to urge their friction facing into engagement with the end faces of the pinion gear. Clutch pressure plates 34 and 35 each has an annular groove indicated respectively by reference numerals 41 and 42. These grooves receive release levers 43 and 44, shown in FIG. 4. Spring 38 is maintained in proper position on shaft 31 by a bearing member 46, which is keyed to the shaft. The bearing member may be in the form of a disc. Shaft 31 has rollers 48 for the shaft's journaling in side plates 49 and 50 of the slide.

The assembly shown in FIG. 3, then, provides a coupling between worm gear 30 and pinion gear 19 through springs and clutch pressure plates. Shaft 31, being journaled in the side plates of the slide, couples the pinion gear to the slide. Rotation of the pinion gear, when so coupled, causes the slide to move up or down, depending on the direction of pinion gear rotation. Disengagement of clutch pressure plates 34 and 35 from the pinion gear, however, allows the pinion gear to free wheel on the shaft free of its drive.

With reference to FIG. 2, worm gear 30 is driven by a worm 52. Worm 52 is mounted on a pin 54. Pin 54 is journaled for rotation in the body of the slide in bearings 55 and 56. Knob 57 provides for hand rotation of the pin and in turn rotation of the worm.

Figure 4:
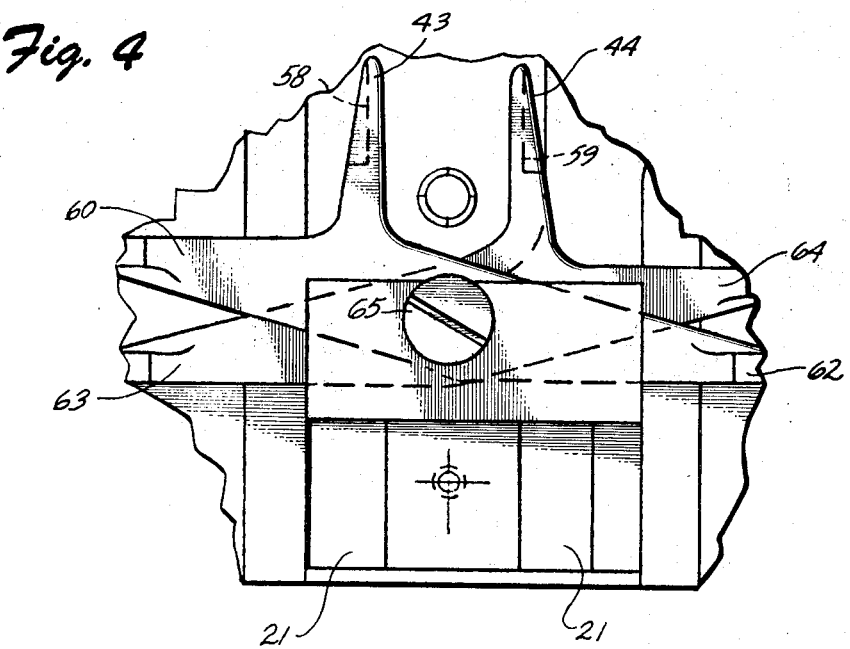
FIG. 4 is a fragmentary view illustrating the release fingers and levers for the clutch in the worm gear, pinion gear drive subassembly illustrated in FIG. 3.

With reference to FIGS. 2 and 4, the pinion gear release fingers and levers of the present invention are illustrated. Levers 43 and 44 extend into grooves 41 and 42 of clutch pressure plates 34 and 35. The levers are recessed at 58 and 59 for receipt in the grooves. As is seen in FIG. 2, the levers are forklike and semicircular in shape to conform to the circular geometry of the grooves they engage. Lever 43 has a pair of oppositely extending operating fingers 60 and 62. Similarly, lever 44 has a pair of oppositely extending fingers 63 and 64. Both levers are pivotally connected to the slide proper as through a fastener 65. Lever 43 overlies lever 44 in its pivotal connection to the slide. The fingers extend at right angles from the lever and when brought together open the release levers. The fingers also extend out either side of the slide assembly for convenient operation by the operator of the height gauge.

As previously mentioned, band 13 is fastened to the slide so that it mirrors the movement of the slide up and down on the staff. The upper portion of band 13 is connected to slide 12 through a leaf spring 67. Leaf spring 67 carries an eye 68 which receives a slot in the band in a conventional manner. The spring extends inwardly for engagement with a dowel 70. A tension adjustment screw 72 threaded in the body of the slide engages the spring and imparts more or less tension to it and band 13, depending on the position of the screw with respect to the body of the slide. In short, the spring thus is fulcrumed at one end by the dowel and engaged to the band at its other end. Band tension can be adjusted by merely adjusting the position of the adjustment screw.

The other end of the band is attached to the slide in a simple manner through a bracket 75. Bracket 75 has a groove which receives the very end of the band and a keeper pin 76 through the band bears on the bracket to keep the band in place.

A slide lock 77 is provided to secure the slide to the staff as for scribing. The slide lock comprises a locking gib 79 mounted on the body of the slide for engagement against face 25 of the staff. This engagement is effected through a thumb screw 80, which is secured to the body of the slide as by threads and bears on the locking gib.

The operation of the height gauge will now be described.

An operator disengages pinion gear 19 from its worm drive by squeezing either set of fingers 60, 63 or 62, 64 together. With the pinion disengaged, the slide can be raised or lowered by hand for coarse adjustment. In the area where measurement is desired, the fingers are released and the pinion is once again coupled to its drive. Fine adjustment through knob 57 can then be effected. The knob imparts rotational motion to worm gear 30 through pin 54 and worm 52. As previously mentioned, the worm gear is coupled to the pinion gear by frictional engagement effected through washer springs 38 and 39 and clutch pressure plates 34 and 35. The sequence is repeated to get whatever vertical measurement is desired.

While coarse and fine adjustment of side 12 is going on, band 13 moves with the slide and imparts to wheel 15 rotation and a direction of rotation. This wheel provides the signal to a continuous read-out circuit to be described now.

The circuit and transducers for mechanical to electrical signals are in base 10 and measurement display housing 85.

Figure 5:
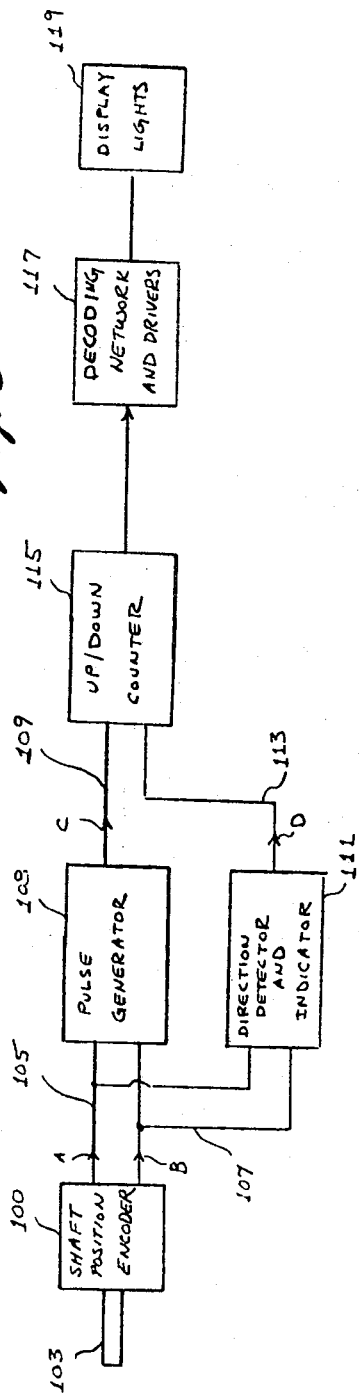
FIG. 5 is a line schematic illustrating the technique for converting a mechanical signal to a suitable electrical signal for the read-out facility of the present invention.

A conventional optical shaft position encoder 100 is shown as a block in FIG. 5. The encoder is of the type commonly known as an incremental encoder. A shaft 103 of the encoder is connected by the gear to the bottom wheel and rotates in one direction, say clockwise, as the slider arm moves up and rotates in the opposite direction as the slider arm moves down.

The encoder provides on signal leads 105 and 107 a two-phase indication comprising binary valued signals A and B. Each binary valued signal has a logical 1 value and a logical 0 value. By way of example, +5.0 volts or thereabout may represent a 1 and 0 volts or thereabout may represent a 0.

While the shaft 103 is stationary, the signals A and B are in one of four static conditions. These four conditions are: A and B each equals 1, only A equals 1, only B equals 1, and neither A nor B equals 1.

The static conditions of the signals do not provide information of significance. However, a transition between binary values in either one of these signals indicates that the shaft has rotated from one position to another. And, owing to the mechanical connection between the shaft and the slide arm, such a transition indicates vertical translation of the slide arm.

Figure 6:
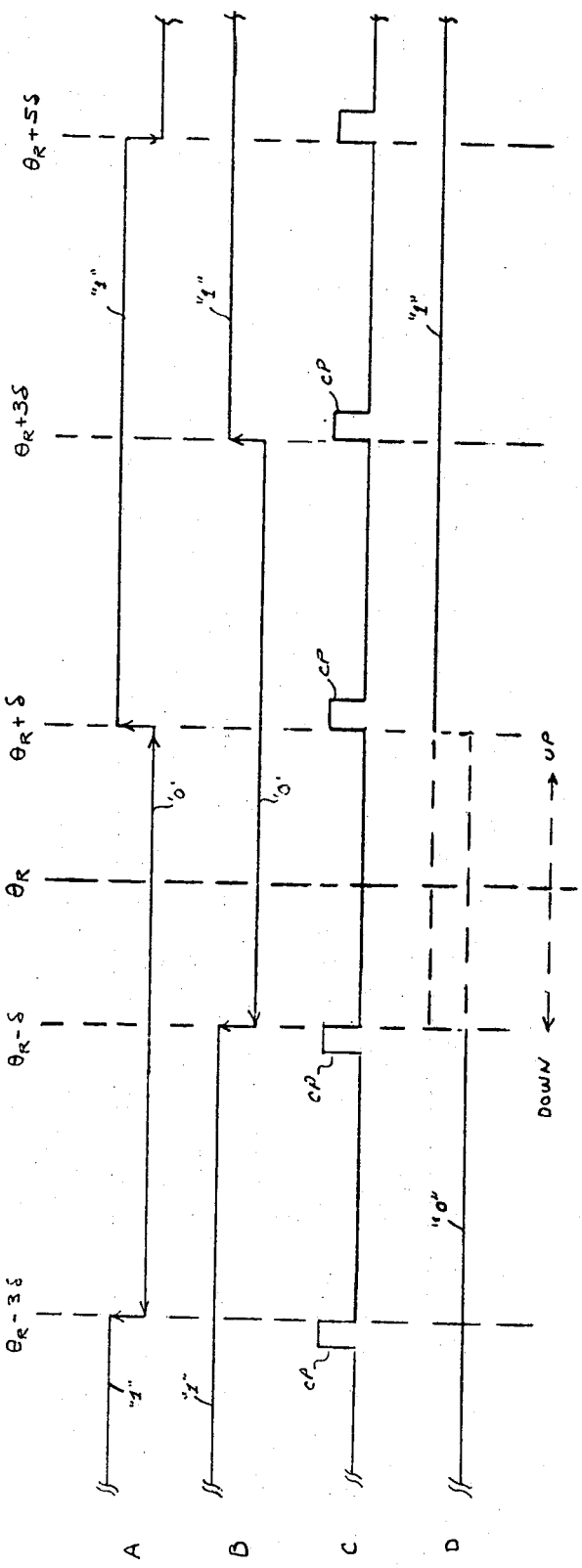
FIG. 6 is a waive form diagram of the electrical signal used in the read-out.

Consider now the waveform diagrams of FIG. 6. As indicated, at an angle $\theta_R$, the A and B signals each equal 0. The angle $\theta_R$ is an arbitrary one of a multiplicity of angles each of which is midway between an angle wherein the A signal switches and an angle wherein the B signal switches. When the slide arm translates up and causes the shaft to rotate to an angle $\theta_R+\delta$, the A signal switches from 0 to 1 while the B signal remains 0. A further rotation in the same direction to an angle $\theta_R+3\delta$ causes the B signal to switch from 0 to 1. On the other hand, when the slide arm translates down and causes the shaft to rotate from $\theta_R$ to $\theta_R - \delta$, the B signal switches from 0 to 1 while the A signal remains 0. A further rotation in the same direction to an angle $\theta_R - 3\delta$ causes the A signal to switch from 0 to 1. The magnitude of the angle $\delta$ is determined by the construction of an optically encoded disk (not shown) in the encoder. In one specific commercially available encoder, this angle is 0.045 degrees.

As the waveforms indicate, when the slide arm translates upwardly, either the B signal switches to assume the same binary value as the A signal or the A signal switches to assume the opposite binary value from the B signal. On the other hand, when the slide arm moves downwardly, either the A signal switches to assume the same binary value as the B signal or the B signal switches to assume the opposite binary value from the A signal.

A pulse generator 108 receives the A and B signals via the signal leads 103 and 105. The pulse generator includes suitable circuitry (not specifically shown) for generating a pulse CP on a signal lead 109 in response to each transition in the A and B signals. By way of example of such suitable circuitry, a pair of resistor-capacitor networks are suitable for differentiating the A and B signals respectively to detect the transitions. A conventional gating arrangement responsive to the spikes resulting from differentation is suitable for providing trigger pulses to a conventional monostable multivibrator circuit. The monostable circuit in turn provides pulses CP of desired characteristics to the signal lead 109.

A direction detector and indicator circuit 111 also receives the A and B signals via the signal leads 105 and 107. The indicator circuit 111 includes suitable circuitry (not specifically shown) for producing a signal lead 113 a binary valued signal D, the value of which indicates whether each transition is the result of upward or downward translation of the slide arm. By way of example of such suitable circuitry, a pair of resistor-capacitor differentiating networks are suitable for producing spikes in response to the transitions in the A and B signals. A tandem connected diode and inverter gate are suitable for providing a pulse in response to each negative-going spike resulting from 1 to 0 transition in the A signal. A diode poled to block these negative-going spikes and to pass positive-going spikes is suitable for providing a positive pulse in response to each positive-going spike resulting from a 0 to 1 transition in the A signal. An identical arrangement of an inverter and a pair of diodes is suitable for providing positive pulses in response to transitions in the B signal. A conventional settable and resettable bistable flip-flop circuit is suitable for producing the D signal. Since the flip-flop exhibits memory, the D wave form illustrated in FIG. 6 has dashed lines between $\theta_R - S$ and $\theta_R + S$. In circumstances wherein upward translation of the slide arm has caused the shaft 103 to reach $\theta_R$, the D signal equals 1. In circumstances wherein downward translation of the slide arm has caused the shaft 103 to reach $\theta_R$, the D signal equals 0. A conventional gating arrangement of AND gates and OR gates is suitable for providing signals to set and to reset the flip-flop. The logical equations defining the gating configurations for providing the set signals (S) and for providing the reset signals (R) are as follows:

$$S = (B\uparrow) \cdot A + (A\downarrow) \cdot B + (B\downarrow) \cdot \overline{A} + (A\uparrow) \cdot \overline{B}$$
$$R = (B\uparrow) \cdot \overline{A} + (A\downarrow) \cdot \overline{B} + (B\downarrow) \cdot A + (A\uparrow) \cdot B$$

where B↑ is the positive pulse resulting from a 0 to 1 transition in the B signal, A↓ is the positive pulse resulting from a 1 to 0 transition in the A signal, B↓ is the positive pulse resulting from the 1 to 0 transition in the B signal, A↑ is the positive pulse resulting from 0 to 1 transition in the A signal. $\overline{A}$ and $\overline{B}$ are the logical complements of A and B respectively and a pair of inverting gates are suitable for providing these signals.

A conventional up/down counter 115 receives the CP pulses via the signal lead 113 and receives the D signal via the signal lead, while the D signal equals 1, the trailing edge of each CP pulse increments the counter. While the D signal equals 0, the trailing edge of each CP pulse decrements the counter. Accordingly the up/down counter accumulates a count that is a digital indication of the height of the slide arm with respect to a reference position.

A conventional gating network 117 decodes the count in the counter 115 and provides drive signals to numerical display lights 119 housed in the display box.

What is claimed is:

1. An improved height gauge comprising:
   a. a staff having a rack gear along a longitudinal length thereof;
   b. a slide to indicate a vertical dimension of an object to be measured, the slide being on the staff and capable of longitudinal movement with respect thereto;
   c. a pinion gear carried by the slide and engaged with the rack gear;
   d. worm drive means on the slide for rotating the pinion gear and raising or lowering the slide with respect to the staff, the worm drive means including:
      i. a worm carried by the slide;
      ii. means on the slide for rotating the worm;
      iii. a worm gear engaged with the worm;
      iv. a shaft carrying the worm gear and keyed thereto;
      v. the shaft being journaled in the slide and carrying the pinion; and
      vi. means to selectively and normally couple the worm gear to the pinion gear;
   e. uncoupling means for uncoupling the worm gear from the pinion gear; and
   f. means for indicating the vertical dimension of an object to be measured.

2. The height gauge claimed in claim 1 wherein:
   a. the coupling means of the worm drive means includes:
      i. a clutch member normally engaged with the pinion gear and carried by the shaft;
      ii. spring means acting on the clutch member to urge the clutch member into engagement with the pinion gear and couple the two together; and
   b. the uncoupling means is operative to disengage the clutch member from the pinion gear.

3. The height gauge claimed in claim 2 wherein the uncoupling means includes a fork member carried by the slide and engaged with the clutch member and means for displacing the fork member and disengaging the clutch member from the pinion gear.

4. The height gauge claimed in claim 3 wherein the fork member is pivotally secured to the slide and the fork member displacing means includes a finger extending from the fork member to an exposed position on the slide for hand actuation of the fork.

5. An improved height gauge comprising:
   a. a staff erectable to a position with its longitudinal axis in the vertical;
   b. a rack gear extending a longitudinal length along the staff;
   c. a slide on the staff and capable of longitudinal movement with respect thereto;
   d. a pinion carried by the slide and engaged with the rack gear;
   e. means for rotating the pinion for movement of the slide longitudinally of the staff, such means being carried by the slide;
   f. means carried by the slide and responsive to longitudinal movement thereof to generate mechanical magnitude and direction signals, such means including:
      i. an upper wheel on an upper portion of the staff for rotation about a horizontal axis,
      ii. a lower wheel on a lower portion of the staff for rotation about a horizontal axis, and
      iii. a closed loop band on the upper and lower wheels for driving the wheels in rotation, the band being attached to the slide for following the slide's movement in both direction and magnitude to generate mechanical direction and magnitude signals, which signals are imparted to one of the wheels by rotation thereof; and
   g. means coupled to the wheel having the mechanical direction and magnitude signals imparted to it to convert the resulting rotational mechanical direction and magnitude signals into electrical signals for use in an intelligence display of direction and magnitude.

6. The height gauge claimed in claim 5 wherein the rotating means includes:
   a. a worm;
   b. means for rotating the worm;
   c. a worm gear engaged with the worm;
   d. a shaft journaled in the slide, carrying the worm gear, and keyed thereto;
   e. the shaft carrying the pinion gear for rotation of the pinion gear on the shaft;
   f. means to selectively and normally couple the worm gear to the pinion gear for driving the pinion gear by the worm gear; and
   g. means to uncouple the worm gear from the pinion gear to permit pinion gear rotation independent of the worm gear.

7. The height gauge claimed in claim 6 wherein the coupling means includes:
   a. a clutch member normally engaged with the pinion gear and carried by the shaft; and
   b. spring means between the worm gear and the clutch member and acting between the two to urge the clutch member into engagement with the pinion gear and couple the worm gear and pinion gear together.

8. The height gauge claimed in claim 7 wherein the coupling means includes:
   a. the clutch member normally engaging an end face of the pinion gear;

b. a second clutch member normally engaging an end face of the pinion gear opposite the end face engaged by the first clutch member; and c. spring means acting on the second clutch member to urge it into engagement with the pinion gear.

9. The height gauge claimed in claim 8 wherein the uncoupling means includes a first and a second lever pivotally secured to the slide and engaging the first and second clutch members, respectively, and means for pivoting the levers in unison for disengaging the clutch members from the pinion gear.

10. The height gauge claimed in claim 9 wherein each of the levers has a finger extending therefrom and to an exposed position on the slide for hand actuation of the lever.

11. The height gauge claimed in claim 5 wherein:

a. the staff has front and rear longitudinally extending faces;

b. the slide has a pair of longitudinally spaced apart feet in engagement with the front face of the staff;

c. a roller is provided carried by the slide and bearing on the rear face of the staff to act in concert with the feet in non-rotationally coupling the slide to the staff; and d. biasing means is provided to urge the roller into engagement with the rear face of the staff.

12. The height gauge claimed in laim 11 wherein the pinion rotating means includes:

a. a worm;

b. means for hand rotating the worm;

c. a worm gear engaged by the worm;

d. a shaft journaled in the slide and carrying the worm gear, the worm gear being keyed thereto;

e. the pinion gear being carried by the shaft and capable of rotation relative thereto;

f. a clutch member carried by the shaft and normally in engagement with the pinion gear;

g. biasing means between the worm gear and the clutch member to urge the clutch member into engagement with the pinion gear and to rotationally couple the pinion gear to the worm gear when the clutch member engages the pinion gear; and h. means on the slide for overcoming the biasing means to disengage the clutch member from the pinion gear and uncouple the worm gear from the pinion gear.

13. The height gauge claimed in claim 12 including means to lock the staff and the slide together.

14. The height gauge claimed in claim 13 wherein the locking means includes:

a. a locking gib carried by the slide and having a locking face for engaging the staff; and b. means for urging the locking gib into engagement with the staff and for maintaining a locking force between the two.

15. The height gauge claimed in claim 14 including means to adjust the tension in the band.

* * * * *

PO-1050
(5/69)

UNITED STATES PATENT OFFICE
CERTIFICATE OF CORRECTION

Patent No. __3,811,192__     Dated __May 21, 1974__

Inventor(s) __Wynn L. Christensen__

It is certified that error appears in the above-identified patent and that said Letters Patent are hereby corrected as shown below:

In the specification: Column 3, line 41, after "one" insert --end--. Column 5, beginning with line 43 and ending at column 7, line 16, "1" and "0" should be --'1'-- and --'0'--, each occurrence. Column 6, line 28, "differentation" should be --differentiation--.

In the claims: Claim 12, column 9, line 28, "laim" should be --claim--.

Signed and sealed this 14th day of January 1975.

(SEAL)
Attest:

McCOY M. GIBSON JR.
Attesting Officer

C. MARSHALL DANN
Commissioner of Patents